(No Model.)

S. G. VOGELEY.
PITCHER.

No. 578,529. Patented Mar. 9, 1897.

WITNESSES:
T. J. Hogan.
F. E. Gaither.

INVENTOR,
Samuel G. Vogeley,
by J. Snowden Bell, Att'y.

UNITED STATES PATENT OFFICE.

SAMUEL G. VOGELEY, OF PITTSBURG, PENNSYLVANIA, ASSIGNOR TO THE UNITED STATES GLASS COMPANY, OF SAME PLACE.

PITCHER.

SPECIFICATION forming part of Letters Patent No. 578,529, dated March 9, 1897.

Application filed August 7, 1896. Serial No. 601,963. (No model.)

*To all whom it may concern:*

Be it known that I, SAMUEL G. VOGELEY, a citizen of the United States, residing at Pittsburg, in the county of Allegheny and State of Pennsylvania, have invented or discovered a certain new and useful Improvement in Pitchers, of which improvement the following is a specification.

The object of my invention is to provide a covered pitcher without independent connections between its body and lid which may be originally employed as a package for preserves, pickles, &c., and thereafter used as a cream or molasses pitcher, or for any other purpose desired, with the capacity of being readily filled and emptied and thoroughly cleaned whenever necessary.

To this end my invention, generally stated, consists in a pitcher having an integral transverse rib on its top opposite its lip and a lid which is recessed to fit over said lip and provided with a lifter projecting outwardly therefrom.

The improvement claimed is hereinafter fully set forth.

Figure 2:
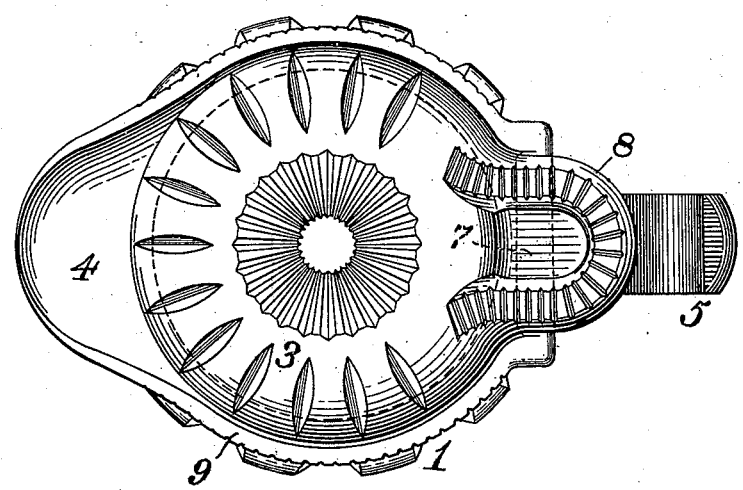
Figure 1:
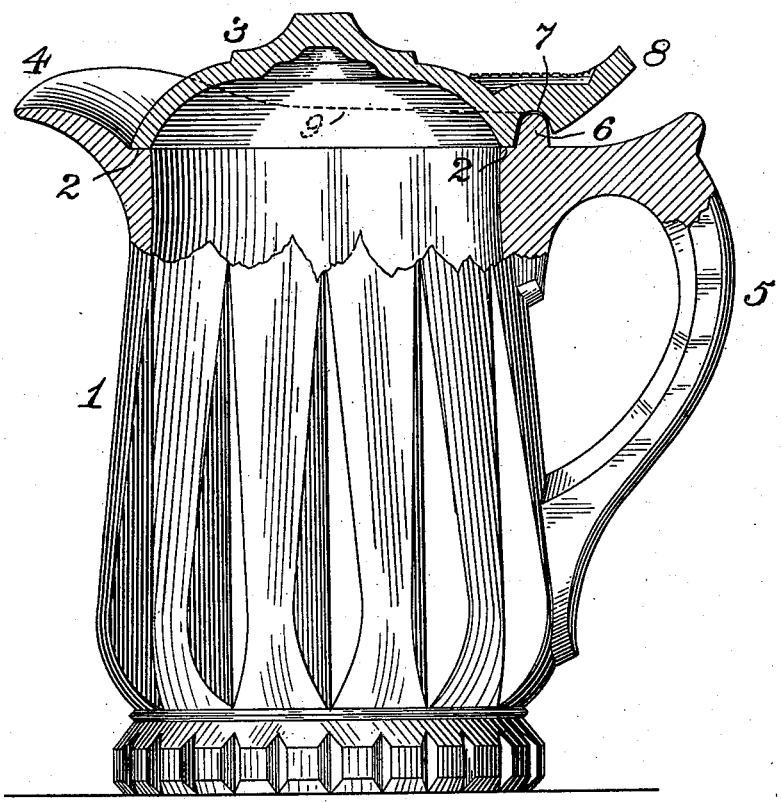

In the accompanying drawings, Figure 1 is a view, partly in elevation and partly in central section, of a pitcher embodying my invention; and Fig. 2, a plan or top view of the same.

In the practice of my invention I form, preferably of glass, a pitcher, the body 1 of which may be of any suitable and preferred size and shape and may be either plain or ornamented on its outer surface. The body 1 is entirely open at its top, on which is formed a flat annular seat 2 for the lid 3, which seat is surrounded by a raised rim 9, extended at one side into a lip 4 for pouring out the contents and turned at the opposite side into a transverse rib 6. A handle 5 is formed on the body on the side opposite the lip 4.

The transverse rib 6, which is integral with the body, extends across the top thereof opposite to the lip 4, said rib being adjacent to and substantially at right angles to the handle 5, said rib being provided as a bearing on which the lid 3 may be tilted upwardly for the purpose of pouring. The lid rests upon the annular seat 2 and inside of the raised rim 9 at the top of the body, and is provided with a transverse recess 7, which fits over the rib 6. A short projecting arm or lifter 8 is formed on the lid, said lifter extending outwardly therefrom a short distance above the handle 5 when the lid is in position on the pitcher.

Under the construction above described it will be seen that the lid is protected from displacement by the raised rim 9, and may be conveniently tilted upward on the rib 6 in the act of pouring, said rib serving as a pivot or journal on which the lid rests without extraneous or independent connections. The lid can be removed and replaced to permit the pitcher and lid to be cleansed whenever desired, and any accumulation of foreign matter on the rib 6 or in the recess 7 of the lid may be readily removed.

I claim as my invention and desire to secure by Letters Patent—

1. The combination of a pitcher having a lip on one side of its top and an integral transverse rib opposite thereto, and a lid having a lower recess fitting over said rib and a lifter projecting outwardly beyond said recess, substantially as set forth.

2. The combination of a pitcher having an annular seat on its top, a lip on one side of its top, an integral transverse rib on the opposite side, and a raised rim extending from the lip to the rib, and a lid fitting on said seat and within said rim, and having a lower recess fitting over said rib and a lifter projecting outwardly beyond said recess, substantially as set forth.

In testimony whereof I have hereunto set my hand.

SAML. G. VOGELEY.

Witnesses:
J. SNOWDEN BELL,
F. E. GAITHER.